(12) United States Patent
Hawkins et al.

(10) Patent No.: US 7,940,254 B2
(45) Date of Patent: May 10, 2011

(54) CONTEXT DRIVEN NAVIGATION MECHANISM

(75) Inventors: Jeffrey Charles Hawkins, Atherton, CA (US); Robert Yuji Haitani, Menlo Park, CA (US); Paul Cousineau, Burlingame, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1318 days.

(21) Appl. No.: 11/460,993

(22) Filed: Jul. 30, 2006

(65) Prior Publication Data

US 2008/0024465 A1 Jan. 31, 2008

(51) Int. Cl.
*G09G 5/00* (2006.01)
(52) U.S. Cl. ........................................ 345/184; 715/784
(58) Field of Classification Search .................. 345/157, 345/160, 168, 172, 184; 707/3, 100; 715/739, 715/784
See application file for complete search history.

(56) References Cited

U.S. PATENT DOCUMENTS

| | | | |
|---|---|---|---|
| 5,635,926 A | 6/1997 | Li | |
| 6,995,749 B2 | 2/2006 | Friend | |
| 2002/0126025 A1 | 9/2002 | Wang | |
| 2003/0035568 A1 | 2/2003 | Mitev et al. | |
| 2006/0082548 A1* | 4/2006 | Kodama | 345/157 |
| 2006/0277167 A1* | 12/2006 | Gross et al. | 707/3 |
| 2007/0080936 A1 | 4/2007 | Tsuk et al. | |

OTHER PUBLICATIONS

Dragan, R., "GoodLink Challenges the RIM BlackBerry," Mar. 11, 2003, PCMag.com, Ziff Davis Publishing Holdings Inc., Copyright 1996-2006, [online] Retrieved from the Internet<URL:http://www.pcmag.com/article2/0,4149,890802,00.asp>.
"GamePC—Logitech Cordless Freedom Optical," Sep. 2001, Solid Electric, Inc., 2007, [online] Retrieved from the Internet<URL:http://www.gamepc.com/labs/view_content.asp?id=lcf&page=1>.
Wildstrom, S.H., "Wireless Gizmos with Fewer Strings," BusinessWeek, Dec. 2, 2002, The McGraw-Hill Companies Inc., Copyright 2000-2007, [online] Retrieved from the Internet<URL:http://www.businessweek.com/magazine/content/02_48/b3810041.htm>.
"Yakumo Keyboard M1," Yakumo, Feb. 2005, 1 page.
"Beyond One-Dimensional Navigation," Logitech Keyboards and Desktops, Logitech, 2004, 4 pages.
"Good G100 Wireless Handheld," Good Technology, Inc., 2005, [online] Retrieved from the Internet<URL:http://www.good.com/index.php/good_g100.html>.
Kronk, K., "Eumax EZ-8000 Office Keyboard," Nov. 9, 2003, The TechLounge, Inc., Copyright 2003-2006, [online] Retrieved from the Internet<URL:http://www.thetechlounge.com/article/86/Eumax+EZ8000+Office+Keyboard/>.
PCT International Search Report and Written Opinion, PCT/US2007/074042, Mar. 28, 2008, 12 pages.

* cited by examiner

*Primary Examiner* — Quan-Zhen Wang
*Assistant Examiner* — Yuk Chow
(74) *Attorney, Agent, or Firm* — Fenwick & West LLP (57) ABSTRACT

A computing navigation mechanism includes a scroll wheel integrated below a keyboard layout for navigation of applications displayed on a computer screen. In one embodiment, the scroll wheel is configured to direct movement in response to a context of interaction with an application visible as active on the computer screen. The scroll wheel includes intra-element scrolling for moving content within a window of the application and for moving between items within a menu of the application and inter-element scrolling for moving between enabled links in the application. Intra-element scrolling may include pane scrolling to move content in the first direction or the second direction within the window pane of an application. It also may include selection scrolling to incrementally select between items in a menu list in a menu. In addition, inter-element scrolling comprises item scrolling, which incrementally moves between links within applications such as a web browser.

8 Claims, 9 Drawing Sheets

Email In-box

Alt-scroll Pane 725    Selection Scroll List 715

| From | Subject | Date ▽ | Size |
|---|---|---|---|
| ! 0 Allen Bush | Foundation Numbers | 7:20am | 2KB |
| ! 0 Tracker-daemon@palm.com | [Bug 142812] Maguffin System Software -Lowercase Letter | 7:23 pm | 7KB |
| Will Rees | Upcoming gig | 4:54 pm | 3KB |
| Kalpak Shah | Maguffin system software status | Yesterday | 1KB |
| Poornima Venkatakrishnan | Need help with revised rssi | 12/08/05 | 12KB |
| Rob Haitani | FW: Justin's start date | 12/07/05 | 13KB |
| Kent Sandvik | maguffin startup sound | 12/07/05 | 9KB |
| Paul Cousineau | Have you seen this? | 12/05/05 | 10KB |
| Greg Shirai | Happy Birthday, dude! | 11/29/05 | 12MB |

TO: Ludo Legrand, RK Perati, Chris Rives, Andres Davidovits, Steve Janiak, Parag Gupta, Tim Pettitt, Audrey Muller, David Sloa...
CC: Rob Haitani, Will Rees, PJ Nidecker, Jeremy Lyon, Justin... ⓘSW Checkpoint Meeting.ppt (468 KB), image123.jpg (2KB), imag...

Maguffin fans,

Only a year ago, podcasting was an arcane activity, the domain of a few techies and self-admitted "geeks." Now you can hear everything from NASCAR coverage to NPR's All Things Considered in downloadable audio files called "podcasts". Thousands of podcasts are available at the iTunes Music Store, and websites such as iPodder.com track thousands more. That's why the editors of the New Oxford American Dictionary have selected "podcast" as the Word of the Year for 2005. Podcast, defined as "a digital recording of a radio broadcast or similar program, available on the Internet for downloading to a personal audio player," will be added to the next update of the New Oxford American Dictionary, due in early 2006.

Runners-up for the 2005 Word of the Year include:
• bird flu (an often fatal flu virus of birds, esp. poultry, transmissible to humans, in whom it may also prove fatal)
• ICE (an entry stored in one's cellular phone that provides emergency contact information)
• IDP (internally displaced person; one forced to relocate within a country due to a natural disaster or civil unrest)
• IED (improvised explosive device, such as a car bomb)

Shift-scroll Pane 720

*File Manager*

Alt-scroll Pane 725

| | Name ▽ | Size | Type | Date Modified |
|---|---|---|---|---|
| File Manager | | | | |
| Storage Devices | Maguffin widgets.doc | 41 KB | Text Document | 12/7/05 9:48AM |
| Maguffin | Spec Review Notes 12_02_05.doc | 153 KB | Text Document | 12/7/05 9:31 AM |
| SD Card | Maguffin UI deltas from NSA.doc | 13.5 MB | Text Document | 12/7/05 8:03 AM |
| USB | Licensing strategy Draft B.doc | 38 KB | Blah Document | 12/6/05 10:23 PM |
| | Treo Press Release11_9_05.doc | 82 KB | Text Document | 12/6/05 9:48AM |
| | Review topics 12_01.doc | 349 KB | Text Document | 12/6/05 9:31 AM |
| | Architectural definition issues | 41 KB | Blah Document | 12/5/05 8:03 AM |
| | Maguffin Mail FRD 3.1.doc | 153 KB | Text Document | 12/5/05 10:23 PM |
| | Localization Design Issues.doc | 13.5 MB | Text Document | 12/4/05 9:48AM |
| | Debug notes.txt | 38 KB | Text Document | 12/4/05 9:31 AM |
| | Maguffin widgets.doc | 82 KB | Blah Blah Document | 12/4/05 8:03 AM |
| | Archive | 2.3 MB | Folder | 12/3/05 10:23 PM |
| | Dialogs | 1.3 MB | Folder | 12/3/05 9:48AM |
| | Look and feel | 2.6 MB | Folder | 12/3/05 9:31 AM |
| | System bar | 839 KB | Folder | 12/2/05 8:03 AM |
| | Widgets | 1 MB | Folder | 12/2/05 10:23 PM |
| Maguffin memory | | | | |
| 160 MB total | | | | |
| 48 MB used | | | | |
| 112 MB free | | | | |

Selection Scroll List 715

CONTEXT DRIVEN NAVIGATION MECHANISM

CROSS REFERENCE TO RELATED APPLICATIONS

This application is related to U.S. patent application Ser. No. 11/461,088, titled "Scroll Mechanism and Keyboard" having Jeffrey Hawkins as named inventor, and filed on the same day as the present application.

BACKGROUND

1. Field of Art

The present invention generally relates to a navigation mechanism, and more particularly, to a context driven navigation mechanism.

2. Description of the Related Art

A scroll mechanism on computer peripheral device such as a computer mouse or trackball device is known. Likewise, a scroll mechanism on a personal digital assistant, for example, the RIM BlackBerry® or Good G100® device, is known. In each instance the scroll mechanism provides a navigation aid that is physically apart from the keyboard input mechanism. One reason for such a configuration in these devices is because the operation and use of the keyboard is functionally separate and distinct from how the scroll wheel is used and applied in that typically the two mechanisms do not operate closely together.

To the extent an input mechanism does closely interact with the keyboard, it is typically a trackpad or trackball device. Such a device, often present on laptop computers and in some keyboard units, is a convenient navigation aid for a user. However, the device is a complex device that requires additional surface area. This additional area increases the size of the overall device on which it resides. This increase in area requires additional manufacturing materials that increases product cost and creates a bulkier, less convenient device for use by an end user.

SUMMARY

An aspect of an embodiment of the present invention includes a data entry interface. The data entry interfaces includes a full-size keyboard and a navigation mechanism. The navigation mechanism is structured to be below the keyboard.

The full-size keyboard (which can be a QWERTY keyboard or corresponding non-United States full-size keyboard such as an AZERTY keyboard to QWERTZ keyboard) includes a plurality of keys arranged in a plurality of rows. The full-size keyboard is configured so that a user's fingers can reside on a home row (or typing position) of the keys, with a user's thumb on or near a space bar. It is noted that a home row corresponds to the A-S-D-F and J-K-L-; (or equivalent keys of the keyboard). In one embodiment, the navigation mechanism is structured to be below the keyboard, e.g., under a bottom row of a plurality of rows of the keyboard as further described herein.

The navigation mechanism includes a scroll wheel (or cylinder or bar), a first button, a second button, a third button (optional) and a fourth button (optional). In one embodiment, the first and the third button are on one side of the scroll wheel and the second and the fourth button are on the other side of the scroll wheel. It is noted that although the term scroll wheel is used, it is intended to include other mechanisms rotatable about a fixed axis such as a roller.

The scroll wheel is structured to be rotatable about an axis. The scroll wheel has wheel surface, a portion of the wheel surface exposed at the data entry interface, and a portion of the wheel surface beneath the data entry interface. The wheel surface configured to move in a first direction and a second direction, each direction having a corresponding movement in the same direction on a screen of a computing system.

The buttons to each side of the scroll beneficially provide additional functionality. By way of example, the first selection button, when depressed, is configured to select an object on the screen of the computing system. Further by way of example, second selection button, when depressed, is configured to display a menu on the screen of the computing system. The third selection button, when depressed, is configured to initiate a first predefined function on the screen of the computing system and the fourth selection button, when depressed, is configured to initiate a second predefined function on the screen of the computing system. Examples of the first predefined function include moving a cursor to a beginning of a line, moving a cursor to a beginning of a page, or displaying a previous page. Examples of the second predefined function include moving a cursor to an end of a line, moving a cursor to an end of the page, or displaying a subsequent page.

With respect to the structure of the navigation mechanism, in one embodiment, the scroll wheel, the first button and the second button are aligned horizontally under the keyboard. Further, in one embodiment, the configuration may have a length that is no greater than a length of a space bar key of the full-size keyboard. In addition, it may have a width that is no greater than a width of the spacebar key of the full-size keyboard. In addition, the placement of the navigation mechanism may be such that when the user interfaces with the full-size keyboard in a conventional home position (e.g., fingers along the A-S-D-F and J-K-L-; keys of the QWERTY keyboard), the scroll wheel is accessible and controllable with thumbs of a user without having to re-position the hands.

Hence, this aspect of an embodiment of the present invention provides a compact navigation mechanism for use with full-size keyboards. The compact design allows for a smaller form factor input interface (e.g., keyboard and navigation mechanism) without loss of functionality or without compromising on the size of the input interface. Thus, devices such as those having a form factor similar to a notebook or sub-notebook can be made smaller. This can help reduce weight and size of such devices, making them more appealing to user markets such as mobile travelers. Yet another aspect of an embodiment of the present invention includes navigation flexibility offered by the navigation mechanism and full-size keyboard. For example, the system can be configured to link modifier keys of the keyboard (e.g., CNTL, ALT, or SHIFT) with the navigation mechanism to allow for additional or enhanced functionality. This allows for more efficient navigation because a user is provided with greater screen and application navigation options without having to re-position user hands relative to the keyboard.

Another aspect of an embodiment of the present invention includes a context driven configuration and operation. In particular, a computing navigation mechanism includes a scroll wheel that is configured to direct movement on a computer screen in response to a context of interaction with an application visible as active on the computer screen. In one embodiment, the scroll wheel is configured to include intra-element scrolling and inter-element scrolling.

Intra-element scrolling includes moving content within a window of the application and for moving between items within a menu of the application. Intra-element scrolling further comprises pane scrolling and selection scrolling. Pane scrolling comprises moving content in the first direction or the second direction within the window pane of an application in response to the content exceeding a size of the window pane of the application being active. Selection scrolling comprises incrementally selecting between items in a menu list in a menu of an application in response to the menu being active.

Inter-element scrolling includes moving between enabled links in an application. Inter-element scrolling includes item scrolling. By way of example, item scrolling includes incrementally moving between links within an active web page that is rendered in a web browser application.

Thus, a benefit this aspect of an embodiment of the present invention includes using a scroll mechanism to navigate within an application or window based on the context of that application or window. This increases navigation flexibility and usability by reducing the need for additional navigation commands within each application or window.

In addition, unlike conventional navigation systems such as trackpads on notebook computers, an embodiment of the present invention differs in a variety of aspects both structurally, e.g., through use of a scroll mechanism integrated with a QWERTY keyboard layout, and functionally, e.g., through configurability of the scroll mechanism to interact with an application based on its context. For example, use of a combination of a keyboard key and the scroll mechanism (or scroll wheel) as defined previously allows for navigation of all areas of the application. In turn, this reduces the number of hand movements and position changes a user must make to accomplish common tasks. The reduced movement, eases user fatigue and increases ease of use. By switching the exact action based on context, the most common task is easily accessible using the scroll wheel, and the next two most common tasks are available using the scroll wheel in conjunction with the modifier keys.

The features and advantages described in the specification are not all inclusive and, in particular, many additional features and advantages will be apparent to one of ordinary skill in the art in view of the drawings, written description, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

DETAILED DESCRIPTION

The Figures (FIGS.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Generally, disclosed is a context driven input mechanism for use on a computing device. In one embodiment, context driven input mechanism is a scroll mechanism with adjacent input or selection buttons. The computing device is a device that serves as a peripheral to a handheld computing device.

Overview Peripheral Device for Handheld Computer

Figure 1:
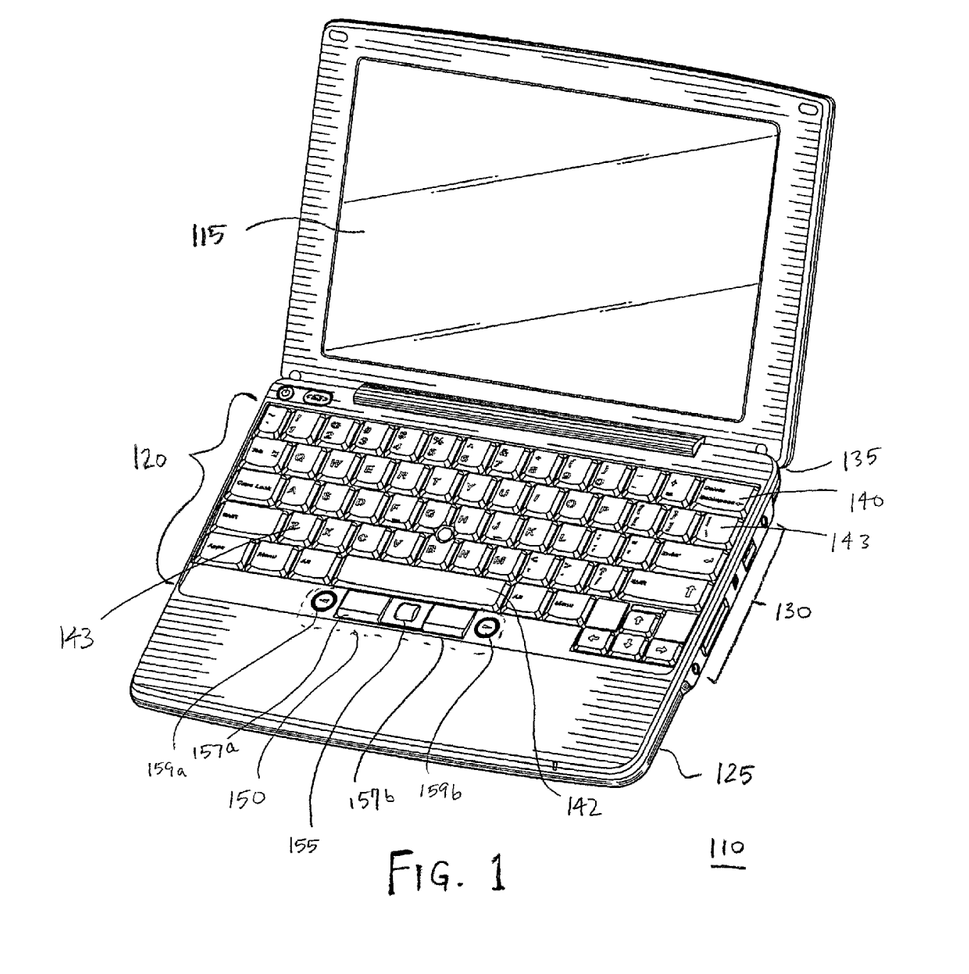
FIG. 1 illustrates a peripheral device for use with a handheld computing device in accordance with one embodiment of the present invention.

Referring initially to FIG. 1, illustrated is a computing device, and more specifically, a device that is a peripheral to a handheld computing device. In the disclosed embodiment, the peripheral status of the peripheral device 110 is from the handheld computing device serving as the primary computing device for a user. In one embodiment, the handheld computing device is a smart phone device (e.g., a TREO® smartphone (or smart phone) from Palm, Inc. (Sunnyvale, Calif.) or the like). The peripheral device 110 includes a screen 115 and an input interface 120. Within a housing 125 of which the input interface 120 is exposed are computing components that include a processor, a memory, and a communications mechanisms and interface (e.g., a Bluetooth, and/or WiFI mechanism and interface). Also included may be input/output mechanisms and ports (or slots) 130, for example, a memory card mechanisms and slot and/or universal serial bus (USB) mechanism and port.

The input interface 120 includes a full-size keyboard 140 (e.g., 27 or more keys) and a scroll area 150. The scroll area is located just under a spacebar key 142 of the keyboard. The scroll area 150 is about the length of the spacebar key 142 (e.g., 90 mm to 110 mm) and about the width of a key 143 (e.g., 10 mm to 15 mm) on the keyboard 140. The scroll area 150 includes a scroll wheel (or cylinder or bar) 155, which is flanked by a button on each side 157a, 157b. Each button 157a, 157b (generally 157) also has a button 159a, 159b (generally 159) next to it. The scroll wheel 155 and the buttons 157, 159 are further described below.

The screen 115 couples the input interface 120 with a hinge-type structure 135. It is noted that the screen 115 also may be an input interface (e.g., a touch sensitive or inductive screen). However, for ease of discussion the screen 115 will be discussed in the context of a conventional screen, e.g., an LCD or plasma screen. The peripheral device 110 is described further below.

Figure 2A:
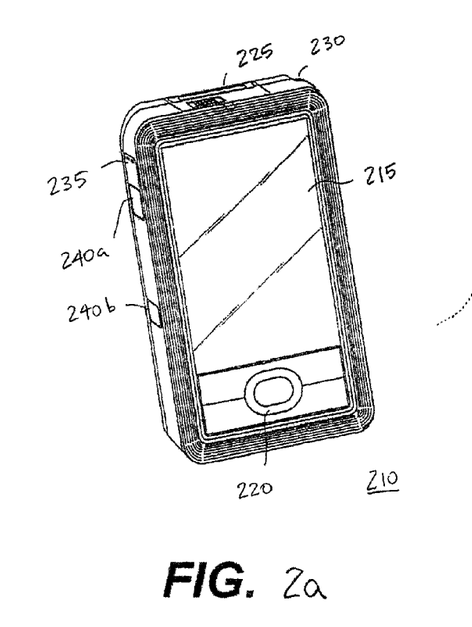
FIGS. 2a through 2c illustrate a handheld computing device in accordance with one embodiment of the present invention.
Figure 2B:
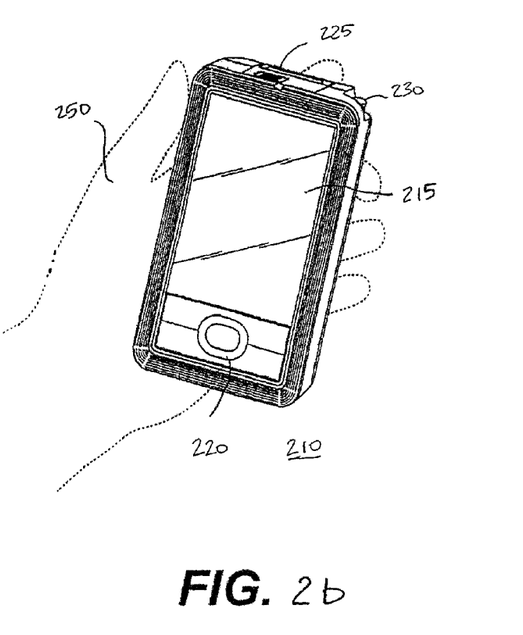
Figure 2C:
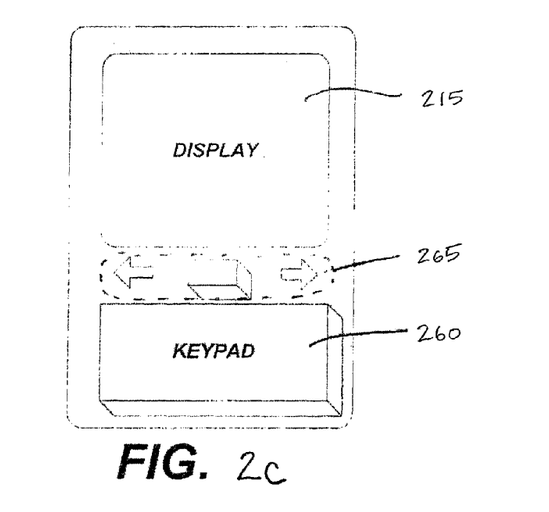

Turning now to FIGS. 2a through 2c, they illustrate embodiments of a handheld computing device 210 in accordance with the present invention. As illustrated in FIG. 1b, the handheld computing device 210 is configured to be of a form factor that is convenient to hold in a user's hand, for example, a personal digital assistant (PDA) or a smart phone form factor. For example, the handheld computing device 110 can have dimensions that range from 8 to 16 centimeters by 5 to 12 centimeters by 1 to 2.5 centimeter and weigh between 70 to 250 grams.

FIG. 2c illustrates an embodiment in which a numeric (e.g., dialpad) or alpha or alphanumeric keypad 260 (e.g., QWERTY or equivalent keyboard such as an AZERTY or QWERTZ keyboard) may be integrated with the handheld computing device 210 (e.g., as found on a TREO® smart phone device by Palm, Inc. (Sunnyvale, Calif.). The embodiment in FIG. 2c also includes a navigation area 265 for controlling functions on the display screen, e.g., cursor movement, selection, and the like, through mechanical or solid state switches, dials, or a combination thereof.

Referring to FIG. 2a, the handheld computing device 210 includes a screen (or display) 215, a screen navigation interface 220, an expansion port (or slot) 225, a stylus 230, a microphone 235, and one or more control buttons, e.g., voice recorder button, screen rotation button, etc., 240a, b (generally 240). The screen is, for example, a 240×240, a 320×320, or a 320×480 transflective TFT color display that includes touch screen or inductive pen support. The expansion slot 225 is configured to receive and support expansion cards (or media cards) that include memory cards such as CompactFlash™ cards, SD cards, XD cards, Memory Sticks™, MultiMediaCard™, SDIO, and the like. Further, the screen navigation interface 220, the stylus 230, the microphone 235, and the one or more control buttons 240 can have various functions applied to them. Again, it is noted that in a full-size keyboard 260 may be integrated as illustrated in FIG. 2c.

Figure 3:
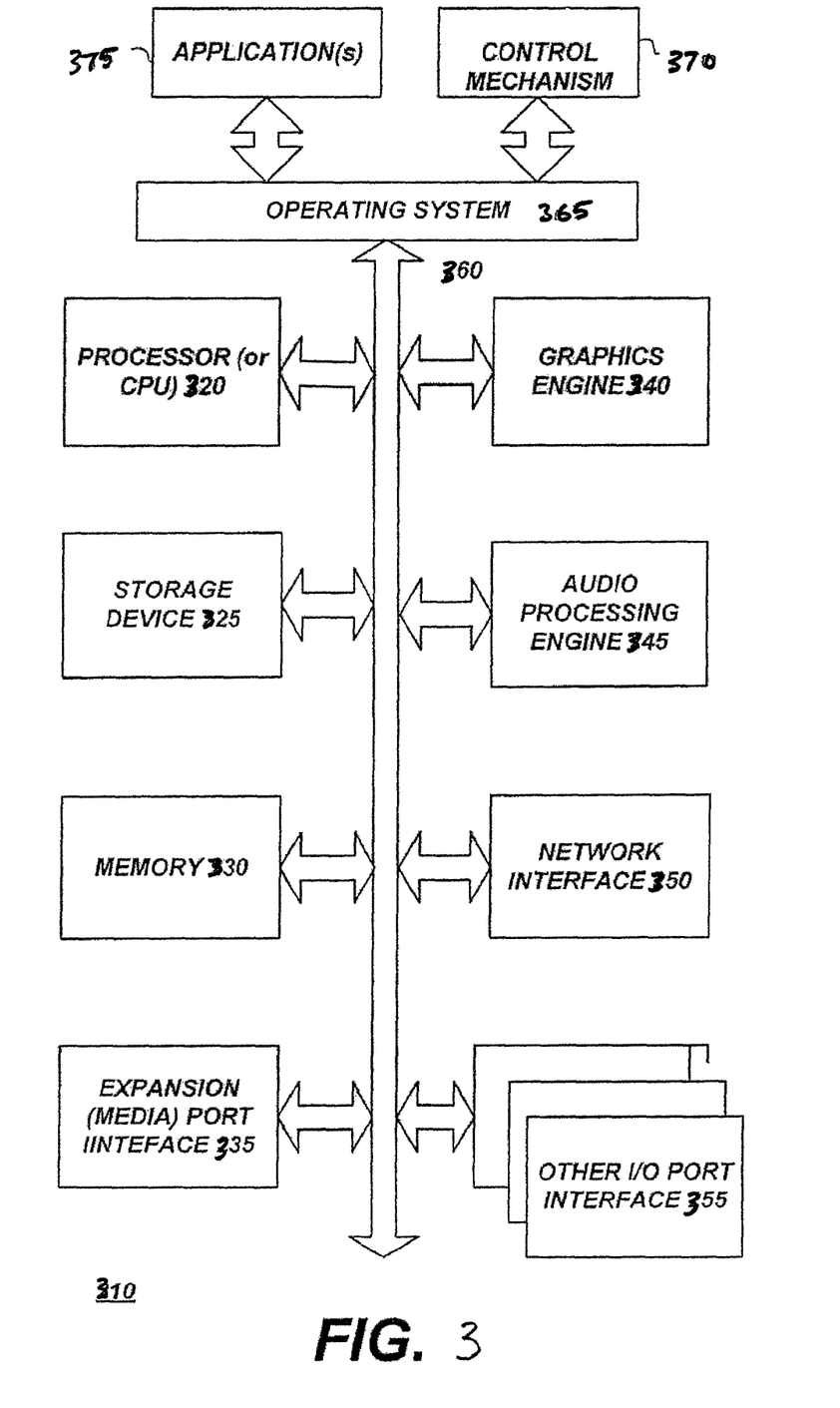
FIG. 3 illustrates an architecture for a handheld computing device in accordance with the present invention.

Turning to FIG. 3, illustrated is one embodiment of a computing architecture 310 of the handheld computing device 310 in accordance with the present invention. The architecture 310 includes a processor (or CPU) 320, a storage device 325, a memory 330, an optional expansion (or media) port interface 335, an optional graphics engine 340, an optional audio processing engine 345, a network interface 350, and one or more other input/output (I/O) port interfaces 355. Each of the components of the computing architecture may be communicatively couple through a data bus 360.

In addition, the architecture 310 also includes an operating system 365 that interfaces with the components of the computing architecture. For example, the computing architecture may include a media control mechanism (or panel) that is configured to interact with the operating system 365. Likewise, it may include one or more applications 375 that are configured to communicate with the operating system 365. The media control mechanism 370 and the applications 375 are communicatively coupled, for example, through the operating system, and the applications 375 can access the media control mechanisms through an application programming interface. The media control mechanisms 370 are configured to provide functional control relative to media applications as further described herein.

The processor 320 can be a microprocessor or controller. In one embodiment the processor 320 is an embedded application processor such as an Intel® XScale™ processor. The storage device 325 is a long term storage device, for example, a hard drive (e.g., magnetic hard drive) or a flash memory drive. The memory 330 is a computing memory such as a random access memory (RAM). The expansion port interface 335 is configured to interface with a media card such as the ones previously described. The optional graphics engine 340 may include hardware, e.g., graphics chip, in addition to software to enhance graphics for display on the screen 215.

The optional audio processing engine 345 is configured for audio related processing such as recording and playback. The audio processing engine 345 includes appropriate hardware (e.g., microphone, speaker, and/or ports (or jacks)) and software (e.g., sound controls) to achieve such functionality. The network interface 350 is configured for network connections to a wide range of networks and includes appropriate hardware and software to communicatively couple to such networks. Examples of networks that can be configured to function with the handheld computing device 110 include personal area networks (e.g., Bluetooth), wireless networks (e.g., IEEE 802.11), and/or telecommunications networks (e.g., cellular or data). The one or more other input/output (I/O) ports 355 include interfaces for connections such as universal serial bus (USB), IEEE 1394 (e.g., FireWire), and the like.

In addition, it is noted that the architecture 310 of handheld computing device is configured to use a conventional operating system 365, for example, Palm OS® from ACCESS Co. Ltd (Tokyo, Japan) or Windows Mobile from Microsoft Corporation (Redmond, Wash.). It is noted that the device can also be configured for use with other operating systems, for example, Linux-based operating systems. The operating system 365 provides an interface for one or more applications, for example, an e-mail, calendar, phone book, web browser, word processing and spreadsheet. In addition, it provides an interface for control mechanisms to operate with the device, for example peripheral devices that are in communication with the handheld computing device 210.

Interoperation of the Devices

The peripheral device 110 is a wireless device that, as noted previously, serves as a peripheral to handheld computing device 210. The peripheral device is structured to include a full-sized input interface (e.g., a keyboard and scroll area) and a full-sized display screen in a single device. A user interacts with data stored on the wireless communication device using the peripheral device as an input/output device. The peripheral device accesses data residing on the wireless communication device and uses such data in executing applications. Documents, files, and other data resulting from execution of applications are stored on the wireless communication device.

The configuration of the devices can be such that the data the user interacts with can stay on the wireless device. Thus, the user may interact with the device when the handheld computing device is either unavailable or dormant with the confidence that their work will be stored until such time as communication with the handheld is re-established. The user does not need to manually transfer data back and forth, synchronization operations are performed by software residing on the two devices, either automatically or at the customers' explicit initiation. The peripheral device 110 is capable of operating with any wireless communication device adapted to establish a connection with the peripheral device 110. For ease of discussion and understanding the wireless communication device referenced will be the handheld computing device 210.

In one embodiment, the peripheral device 110 is structured to have an outward appearance resembling a conventional laptop-type (and more closely a sub-notebook-type) computer, including the screen 115 and the keyboard 140, connected by a hinge-type structure 135. The peripheral device 110 is capable of performing automatic configuration and wireless connection to the handheld computing device 210. In one embodiment, whenever the user opens the peripheral, the peripheral automatically turns itself on and attempts to establish a connection with the handheld computing device 210.

The peripheral device 110 is connected to the handheld computing device 210 using any communication technology that allows for data transmission between the peripheral device and the wireless communication device. In a preferred embodiment, the peripheral device 110 and the handheld computing device 210 are connected using a wireless connection. In another embodiment, the peripheral device 110 connects with the handheld computing device 210 through an electrical or optical cable interface. In yet another embodiment, the peripheral device 210 connects to the handheld computing device 210 using a mechanical interface.

The peripheral device 110 can be implemented according to various embodiments. In one embodiment, the peripheral device 110 functions as an input/output peripheral for the handheld computing device 210. In this configuration applications run only on the handheld computing device 210 and not on the peripheral device 110; accordingly, the peripheral device need not even include a processor. In another embodiment, the peripheral device 110 is capable of downloading applications residing on the handheld computing device 210 and running them using a processor of the peripheral device 110. In yet another alternative embodiment, the peripheral device 110 is capable of storing applications and/or data from one session to the next, so as to minimize the amount of information to be transferred between the devices, and to act as a backup mechanism for data stored on the handheld computing device 210. In an alternative embodiment, an arrangement advantageously allows a user to restore data if the data is lost on the handheld computing device 210.

As previously mentioned, the peripheral device 110 may be implemented in a laptop-like configuration including the screen 115 and keyboard 140. Alternatively, the peripheral device 110 can be implemented as software running on a conventional computer system, such as a laptop computer or desktop computer. In such an embodiment, the peripheral device runs software that allows the device to function as a peripheral device for a handheld computing device 210.

The peripheral device 110 uses the handheld computing device 210 to connect to available networks such as the Internet. For example, a user of the peripheral device 110 makes use of a browser application, for example, NetFront, Pocket Internet Explorer or other Internet browser, to request web pages and interact with received web pages. The handheld computing device 210 functions as an intermediary in passing requests for web pages and providing web pages to a user of the peripheral device 110. Depending on the particular embodiment, as described herein, the browser application may run on the handheld computing device 210 or on the peripheral device 210 itself.

Scroll Area for Navigation

Figure 4:
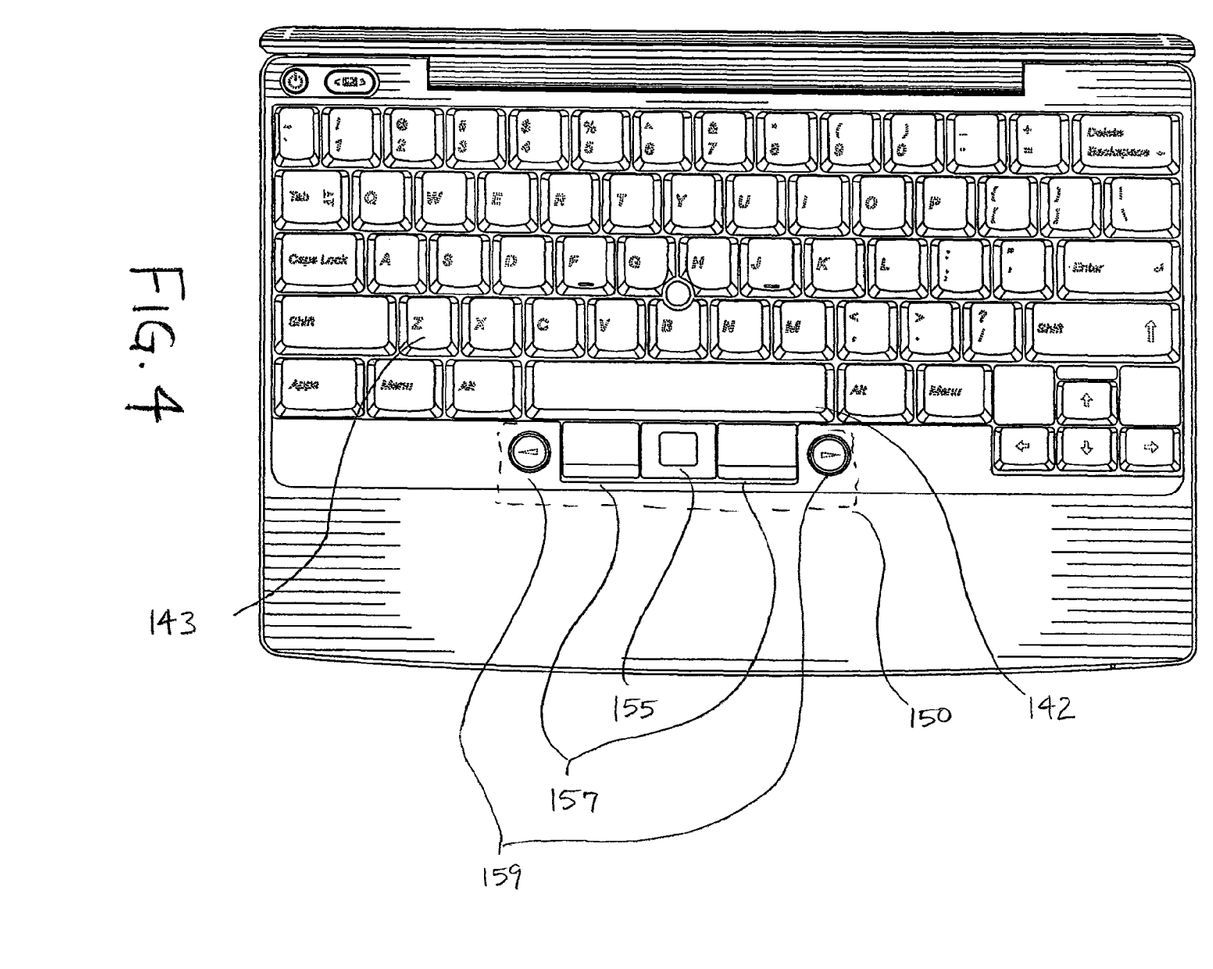
FIG. 4 illustrates an input interface for a peripheral device in accordance with one embodiment of the present invention.

Turning next to FIG. 4, it illustrates an input interface for a peripheral device in accordance with one embodiment of the present invention. In this configuration, the input interface is illustrated as a full-size keyboard (which can we a QWERTY, AZERTY, QWERTZ or other similarly configured keyboard). In the illustrated embodiment, a QWERTY-type keyboard has a row of keys that are predominately number keys, followed by three rows of keys that are predominately letter keys, followed by a row of keys that are predominately control and special keys, including the space bar. Below the keyboard is a horizontal structural arrangement for the scroll area 150. In one embodiment, reference to below is with respect to positioning in an x-y plane. For example, if a home row (e.g., A-S-D-F and J-K-L-; keys of a QWERTY keyboard) is along an x-axis and at a y-axis=0 (or approximately 0), keys above (e.g., Q-W-E-R-T-Y) are at a +y direction and keys below (e.g., Z-X-C-V-B or a spacebar) are at a −y direction.

Figure 5:
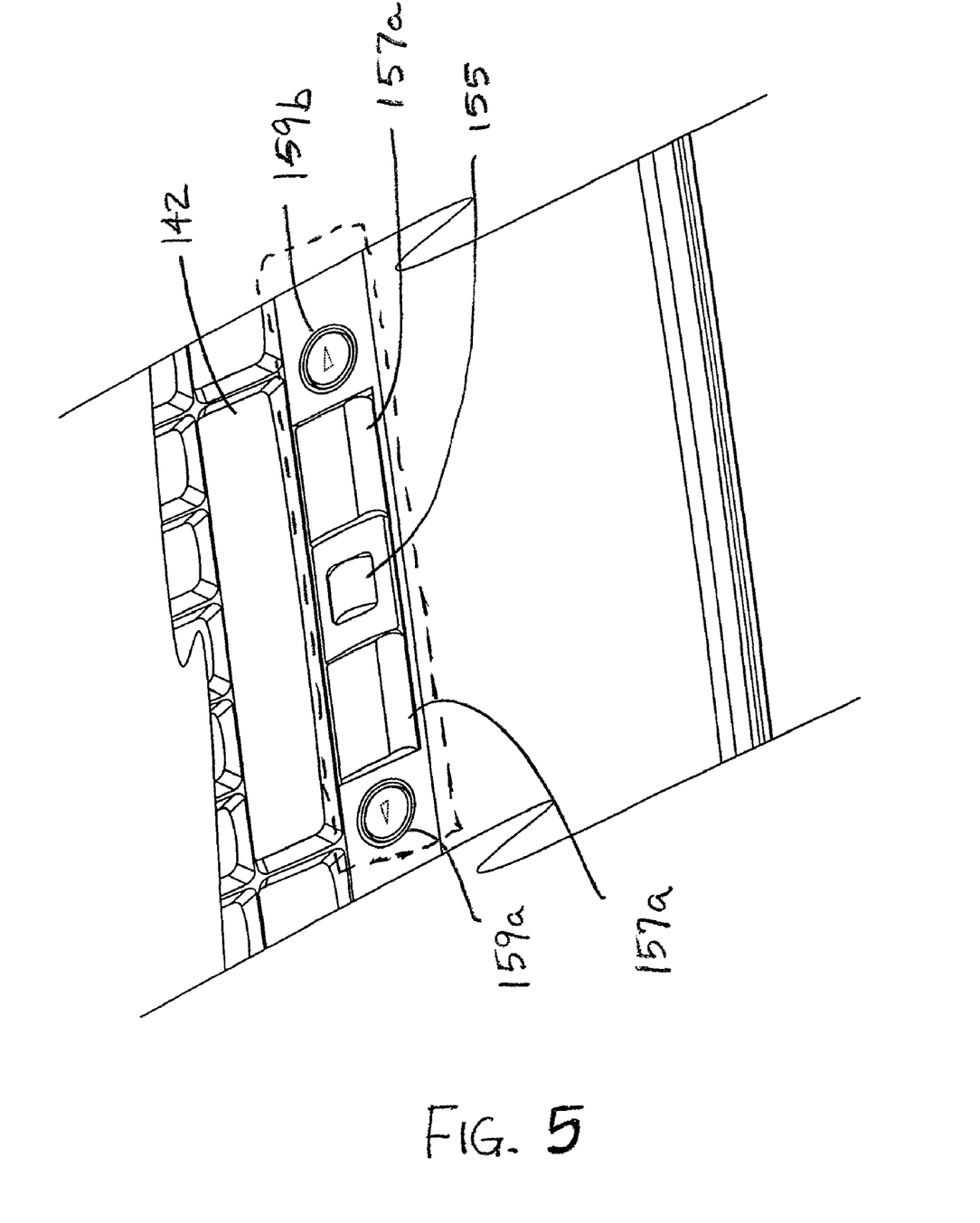
FIG. 5 illustrates an example of a context driven scroll mechanism for a peripheral device in accordance with one embodiment the present invention.
Figure 6A:
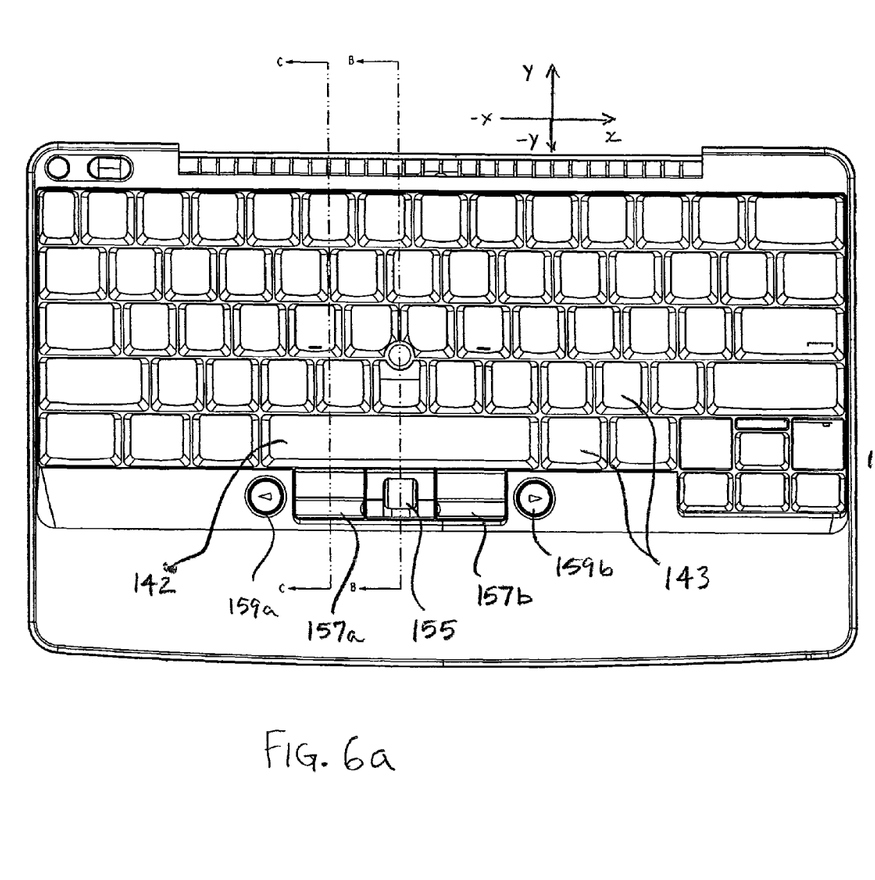
FIGS. 6a through 6c illustrate front and side views of a context driven scroll mechanism for a peripheral device in accordance with one embodiment of the present invention.
Figure 6B:
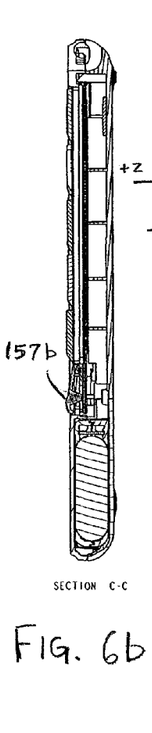

Referring to FIG. 5, it illustrates a closer view of an example the scroll area 150, which is a context driven scroll mechanism, for the peripheral device in accordance with one embodiment the present invention. As noted above, the scroll area 150 includes the scroll wheel 155, which is flanked by buttons on each side 157a, 157b. In one embodiment, the buttons are similar to selection buttons associated with a mouse or trackpad mechanism. With the discussion of FIG. 5, reference also will be made to FIGS. 6a through 6c, which illustrate front (face) and side views of a context driven scroll mechanism for a peripheral device in accordance with one embodiment of the present invention.

Figure 6C:
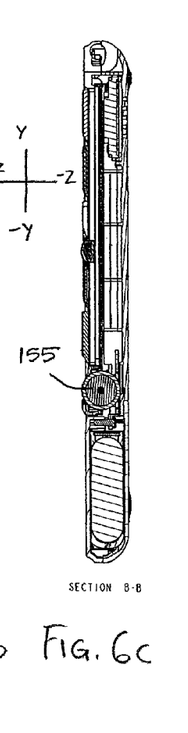

In the illustrated embodiment, the scroll wheel 155 is configured so that it moves about an axis in a +Y (up) or −Y (down) direction in an x-y-z Cartesian coordinate system (e.g., FIG. 6c). In addition, each button 157a, 157b is a selection-type button that moves in a +Z (up) and −Z (down) direction in an x-y-z Cartesian coordinate system (e.g., in a force-resistance configuration in FIG. 6b). In one embodiment, the selection type button 157 may be structured as rectangular-shaped pointing device type selection buttons. It should be well understood that other shapes (e.g., squares, trapezoids, ovals, etc.) may be used for the buttons 159 without detracting from its functionality.

The selection buttons 157 may be pre-configured to work in conjunction with a pointing device to act as conventional selection buttons. For example, the conventional selection buttons may be configured to include a right click (button 157a) to bring up a menu in an application and left click (button 157b) to select an item in the menu or application. Alternatively, it may be programmed by a user through a software mechanism a user interacts with on the device or it may be configured to automatically change functionality depending on the context of what is an active application on a screen, as further described below.

Unlike conventional laptop-type configurations, each selection type button 157a, 157b (generally 157) also has additional functional buttons 159a, 159b (generally 159) immediately next to it on its outer side. In one embodiment additional functional buttons 159 may be structured as circle shaped buttons that move in the +Z or −Z direction and may be surrounded by an outer ring that may help further distinguish its structure relative to the other buttons 157. It should be well understood that other shapes (e.g., squares, hexagons, octagons, etc.) may be used for the buttons 159 without detracting from its functionality.

The additional functional buttons 159 may be pre-configured, for example, go to a previously viewed page or skip to the next page in a viewing history while a user keeps hands in a conventional typing (or "ready") position (e.g., fingers on the home row keys (e.g., A-S-D-F/J-K-L-; keys or equivalent)) or may be programmed by a user through a software mechanism a user interacts with on the device. Alternatively, it may be configured to automatically change functionality depending on the context of what is an active application on a screen, as further described below.

Turning back to FIG. 4, It is noted that the scroll area 150 is configured so that when a user places their fingers on the home row (e.g., A-S-D-F keys (left hand fingers) and J-K-L-; keys (right hand fingers) or equivalent), a user's thumb (or thumbs) are positioned to be on or near the space bar. In this configuration, a user's thumbs could comfortably reach space bar as well as the scroll area 150 scroll wheel 155 and/or selection buttons 155 and/or functional buttons 159. Hence, this configuration helps optimize usability of the scroll area and provides greater control for a user for functions performed through the input mechanisms (e.g., scroll wheel 155, buttons 157, 159) in the scroll area 150.

The configuration disclosed herein provides a compact navigation mechanism for use with full-size keyboards. The compact design allows for a smaller form factor input interface (e.g., keyboard and navigation mechanism) without loss of functionality or without compromising on the size of the input interface. Thus, devices such as those of a having a form factor similar to a notebook or sub-notebook can be made smaller without reducing key size further. This can help reduce weight and size of such devices, making them more appealing to user markets such as mobile travelers.

Contextual Scrolling

Figure 7A:
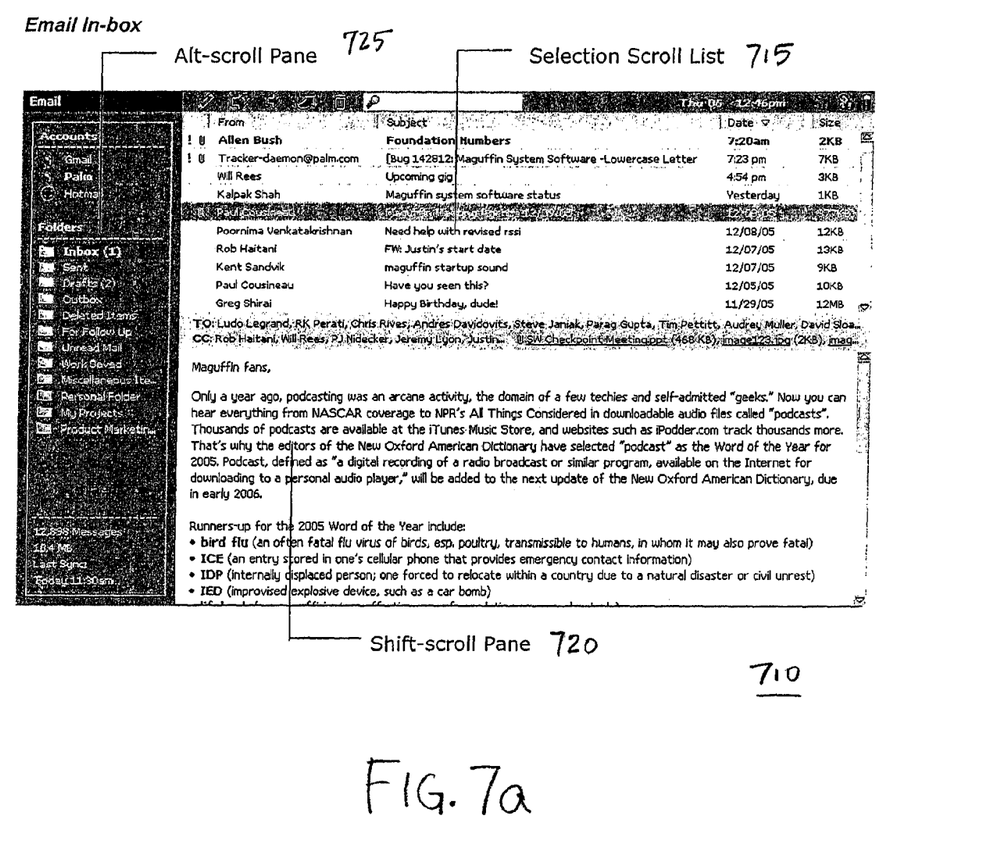
FIGS. 7a through 7c illustrate applications displayed on a screen of a peripheral device and manipulated by a context driven scroll mechanism in accordance with one embodiment of the present invention.
Figure 7B:
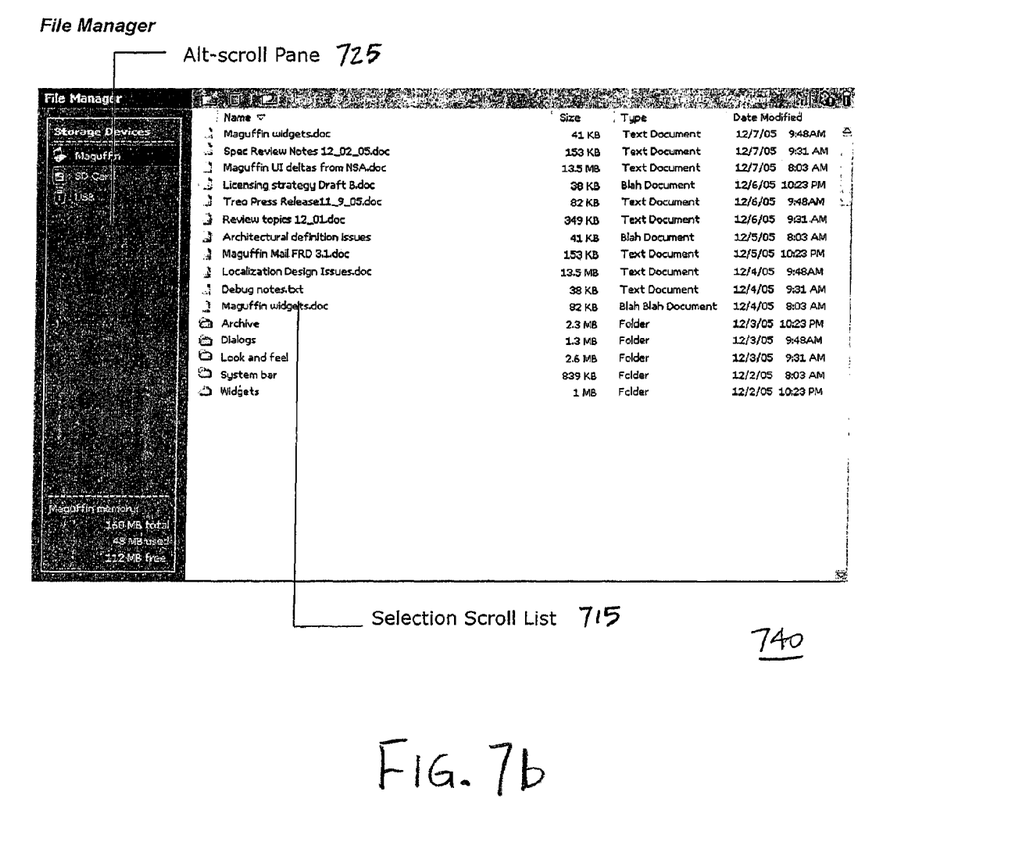
Figure 7C:
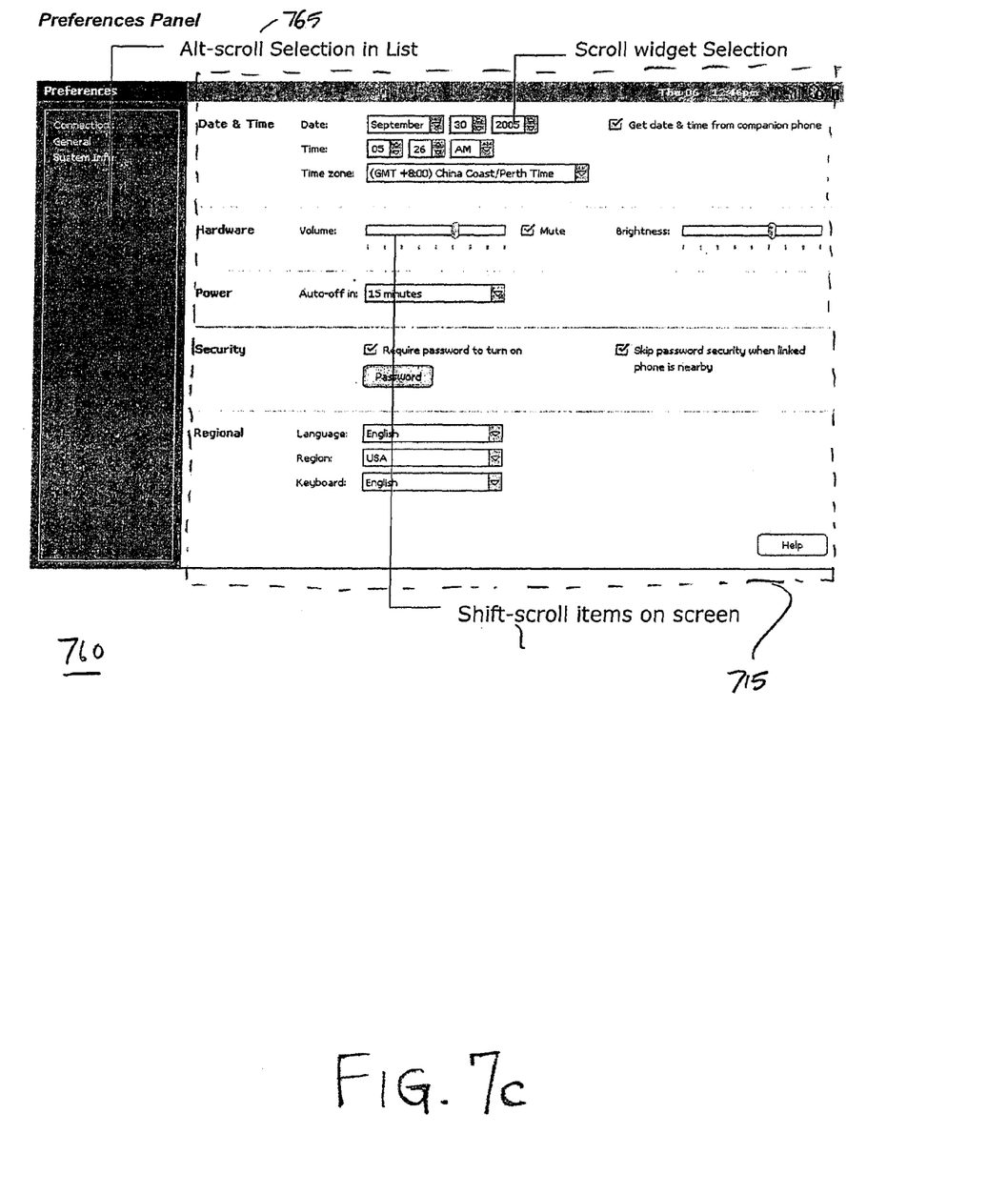

FIGS. 7*a* through 7*c* illustrate example applications displayed on a screen of a peripheral device and manipulated by a context driven scroll mechanism in accordance with one embodiment of the present invention. The examples are used to illustrate and describe how the scroll wheel 155 is configured to do different things in places. To that extent, the scroll wheel can be further described through three different functions that include, scrolling, selection scrolling, and item scrolling.

With respect to scrolling, a typical use for scrolling includes 'pane scrolling', moving the content window for content panes, and fields. Selection scrolling includes maintaining a specific selection, such as the List, Stepper and Dropdown menu. "Scrolling" these with the scroll wheel will increment the selection within the list. The actual incremental movement can be predefined, for example, go through each item in a serial order or in a group order. As for item scrolling, it includes link walking on a web page or moving the focus ring to sequential items in the focus queue within an application or dialog. In some embodiments, item scrolling is similar to tabbing or shift-tabbing.

In general, in one embodiment the scroll wheel 155 is configured for intra-element scrolling and inter-element change. Intra-element scrolling includes pane scrolling and selection scrolling. Inter-element change includes item scrolling. In some embodiments, item scrolling may be accomplished via shift-scrolling the scroll wheel (e.g., press and hold SHIFT key and scroll on scroll wheel 155), which may be beneficial if functional conflicts arise.

The scroll wheel 155 also can be configured for page scrolling and horizontal scrolling. Page scrolling includes scrolling by roughly the full pane of content less two or three lines for reading continuity. Horizontal scrolling includes moving contents of the screen left or right by a pre-determined number of pixels at a time. This may be beneficial if there is much information laid out side by side, for example, for a large spreadsheet.

Unlike conventional navigation systems such as trackpads on notebook computers, an embodiment of the present invention differs in a variety of aspects both structurally, e.g., through use of a scroll mechanism integrated with a full-size keyboard layout, and functionally, e.g., through configurability of the scroll mechanism to interact with an application based on its context. For example, use of a combination of a keyboard key and the scroll mechanism (or scroll wheel) as defined previously allows for navigation of all areas of the application. In turn, this reduces the number of hand movements and position changes a user must make to accomplish common tasks. The reduced movement, eases user fatigue and increases ease of use. By switching the exact action based on context, the most common task is always easily accessible using the scroll wheel, and the next two most common tasks are available using the scroll wheel in conjunction with the modifier keys of the keyboard.

Referring now to FIGS. 7*a* and 7*b*, functionality of one embodiment of the scroll wheel will be described in the context of an electronic mail (email) application 710 (FIG. 7*a*) and a file manager application 740 (FIG. 7*b*). In FIG. 7*a*, the email application 710 is separated into three functional regions relative to the scroll wheel 155 functionality. For example, a first region is a selection scroll list 715 where the email messages accumulate in a list format and may be selected based on sender (from), subject, date, or size. The items in the list may be navigated by rotating the scroll wheel 155 to trigger a functional response that corresponds to the selection scroll principles described previously.

The second region is a shift-scroll pane 720 which previews the selected item from the first region. This illustrates the pane-scrolling functionality described previously. In this region, the scroll wheel 155 is configured for moving the contents of the pane up (+Y) or down (−Y) based on pressing and holding the SHIFT key and moving the scroll wheel 155 up or down. In another embodiment, the system is configured for use of ALT+scroll for selection scrolling within a folder list. It is noted that the various scrolling options can be further assigned to other regions of the application. For example, the mechanism can be configured (e.g., predefined or through a user interface of an application providing scroll key 155 functional management) to work with a function key such as ALT on the keyboard along with the scroll wheel in that region. Thus, in the email application 710 example, ALT+scroll allows for pane scrolling or item scrolling, depending on the functional definition applied to this combination, in the region to the left of the application interface.

FIG. 7*b*, illustrates that if a user switches the active application (e.g., the application the user is interfacing with or working with) from the email application 710 to the file manager application 740, the context of how the scroll mechanism is configured to operate also switches. In this example, moving the scroll wheel selection scrolls the file list 715, while ALT+scroll selection scrolls the list of storage devices visually presented in the pane 725.

Referring now to FIG. 7*c*, it illustrates an example of preferences panel for a widget application 760. In this example, the context of the scroll wheel 155 is configured to provide ALT+scroll selection in list format in a menu selection pane (or region) 725 and SHIFT+scroll in another pane (or region) 715. Within the SHIFT+scroll region the context of shift-scrolling moves focus based on the operation to be performed. For example, there is scroll selection in a drop down box region 775 for selection of DATE-TIME options and a shift-scroll item on screen in a button region 785 for selection of volume. Thus, the scroll wheel 155 is configured for different functionality within the preferences panel of the widget application 760, as well as the email application 720 and file manager application 740.

In addition, the table below describes how elements (or regions) within an application window can be configured to function in the context of the scroll wheel 155 operation and subsequent use of a space bar key, enter key, selection button (e.g., 157) or button (e.g., 159).

Element Activation (e.g., within Application of FIG. 7B)

| Ability to activate a selection within a UI element using the Space or Enter keys. | |
|---|---|
| Region (Element) | Function |
| Pane | n/a |
| Field | n/a (enters text character) |
| List | (optionally activates selection) |
| Stepper | n/a |
| Dropdown | opens dropdown or enters selection and closes list |
| Button | submits button |
| Radio | selects focused option |
| Check box | toggles focused option on and off |

Hence, a benefit of a configuration as disclosed herein includes using a scroll mechanism to navigate within an application or window based on the context of that application or window. This increases navigation flexibility and usability by reducing the need for additional navigation commands within each application or window.

As recognized through the example of the handheld computing device embodiment described herein, the various embodiments disclosed herein may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations.

The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be implemented, for example, using any computer-readable media, machine-readable media, or article capable of storing software. The media or article may include any suitable type of memory unit, memory device, memory article, memory medium, storage device, storage article, storage medium and/or storage unit, such as any of the examples described with reference to a memory. The media or article may comprise memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), subscriber identify module, tape, cassette, or the like. The instructions may include any suitable type of code, such as source code, object code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, JAVA, ActiveX, assembly language, machine code, and so forth. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or"

refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of embodiments of the present invention. This was done merely for convenience and to give a general sense of the embodiments of the present invention. This description should be read to include one or at least one and the singular also includes the plural unless it is obvious that it is meant otherwise.

Upon reading this disclosure, those of skill in the art will appreciate still additional alternative structural and functional designs for a system and a process for a context driven navigation mechanism through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a data entry interface comprising a keyboard having a plurality of keys arranged in a plurality of rows, a navigation mechanism structured below a bottom row of the plurality of rows, the navigation mechanism comprising:
   a scroll wheel rotatable about an axis, having a wheel surface, a portion of the wheel surface exposed at the data entry interface and a portion of the wheel surface hidden beneath the data entry interface at all times, the wheel surface configured to move in a first direction and a second direction, each direction having a corresponding movement in the same direction on a screen of a computing system;
   a first selection button and a second selection button, each on opposite sides of the scroll wheel, the first selection button when depressed configured to select an object on the screen of the computing system and the second selection button when depressed configured to display a menu on the screen of the computing system; and
   a third selection button and a fourth selection button, each on opposite sides of the first and the second selection buttons, the third and fourth buttons a part of the navigation mechanism and not a part of the keyboard keys arranged in a plurality of rows, the third selection button when depressed initiating a first predefined function on the screen of the computing system and the fourth selection button when depressed initiating a second predefined function on the screen of the computing system.

2. The navigation mechanism of claim 1, wherein the first predefined function comprises one of moving a cursor to a beginning of a line, moving a cursor to a beginning of a page, and displaying a previous page.

3. The navigation mechanism of claim 1, wherein the second predefined function comprises one of moving a cursor to an end of a line, moving a cursor to an end of the page, and displaying a subsequent page.

4. The navigation mechanism of claim 1, wherein the scroll wheel, the first button and the second button are aligned to have a length no greater than a length of a space bar key of the keyboard.

5. The navigation mechanism of claim 4, wherein the scroll wheel, the first button, and the second button are aligned to have a width no greater than a width of a space bar key of the keyboard.

6. The navigation mechanism of claim 1, wherein the navigation mechanism is controllable with thumbs of a user when the user fingers are on A-S-D-F and J-K-L-; keys on the keyboard.

7. The navigation mechanism of claim 1, wherein the scroll wheel is configured to interoperate with a functional key for different functional operation within a region of an application.

8. The navigation mechanism of claim 1, wherein in the full-sized keyboard the functional key is one of an ALT key, a SHIFT key or a CNTL key.

* * * * *